United States Patent
Degen et al.

(10) Patent No.: US 7,752,962 B2
(45) Date of Patent: Jul. 13, 2010

(54) METHOD AND DEVICE FOR COMPRESSING HARVESTED CROP MATERIAL TO PRODUCE SILAGE

(75) Inventors: Peter Degen, Sassenberg (DE); Andreas Haffert, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 123 days.

(21) Appl. No.: 11/678,719

(22) Filed: Feb. 26, 2007

(65) Prior Publication Data

US 2007/0212204 A1 Sep. 13, 2007

(30) Foreign Application Priority Data

Feb. 28, 2006 (DE) .................. 10 2006 009 573

(51) Int. Cl.
*A01F 25/18* (2006.01)
*B30B 3/00* (2006.01)

(52) U.S. Cl. ................. 100/238; 100/66; 100/265; 56/16.4 B

(58) Field of Classification Search ............... 100/35, 100/65, 67, 68, 69, 217, 223, 224, 233, 238, 100/265, 66; 56/16.4 B
See application file for complete search history.

(56) References Cited

U.S. PATENT DOCUMENTS

| 3,731,468 | A | * | 5/1973 | Blumhardt | ............... 56/16.4 B |
| 4,189,902 | A | * | 2/1980 | Kaetzel | ................. 56/15.6 |
| 6,739,535 | B2 | * | 5/2004 | LaBarbera | ........... 241/101.72 |

FOREIGN PATENT DOCUMENTS

| DE | 75 32 909 | | 3/1976 |
| DE | 3512040 A1 | * | 10/1986 |
| DE | 44 32 823 | | 11/1995 |
| DE | 19524899 A1 | * | 1/1997 |

* cited by examiner

*Primary Examiner*—Jimmy T Nguyen
(74) *Attorney, Agent, or Firm*—Michael J. Striker

(57) ABSTRACT

A method and a device are provided to compress crop material laid down in single layers for producing silage in a horizontal silo, with the use of an agricultural working machine, that carries a compressing device, the crop material laid down in single layers is compressed by at least one compressing element, and the at least one compressing element weighs on the crop material and moves relative to it.

14 Claims, 2 Drawing Sheets

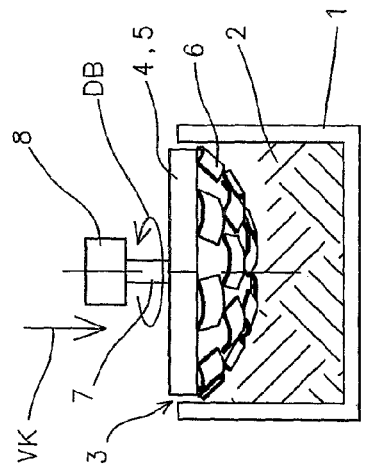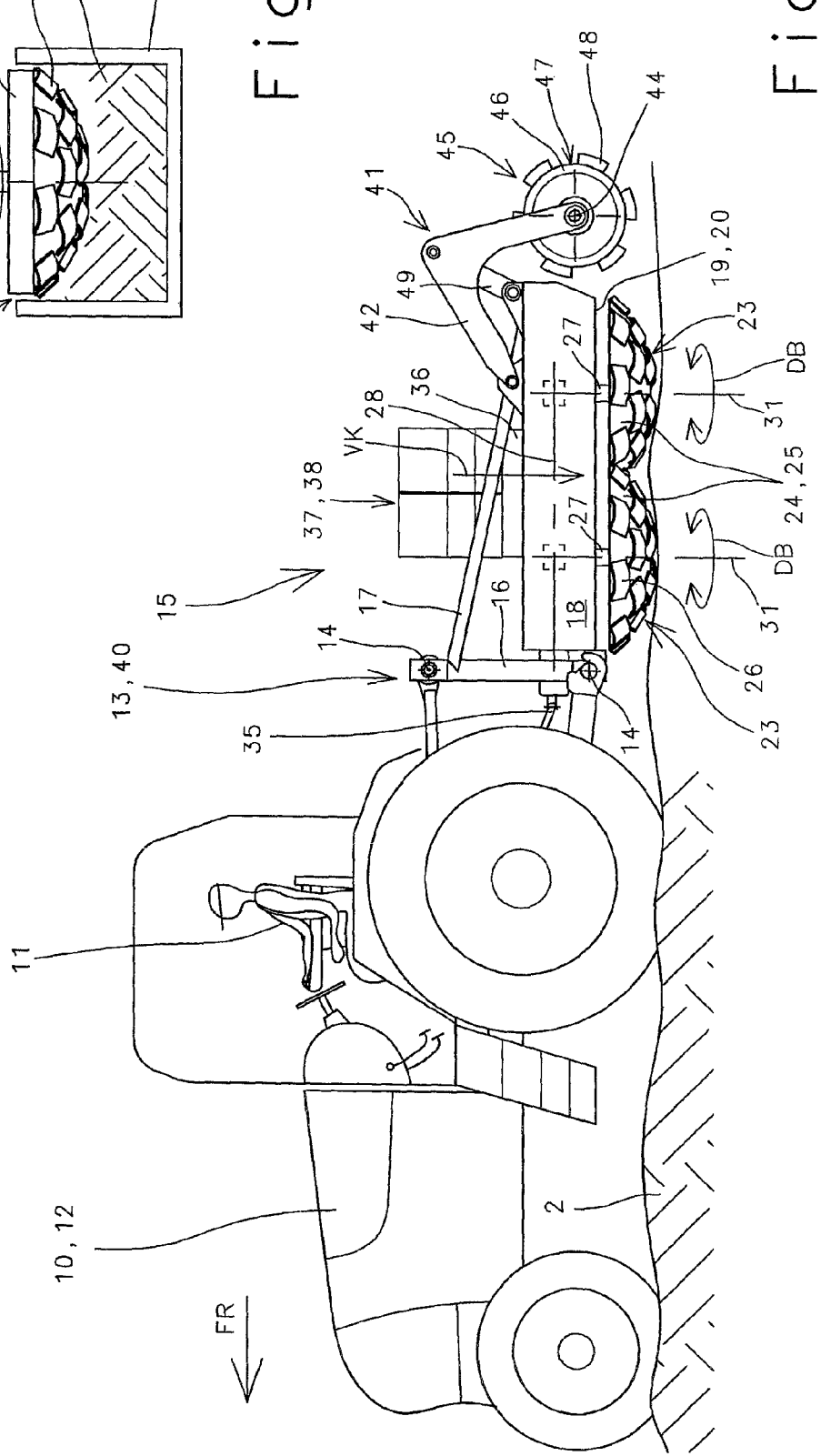

METHOD AND DEVICE FOR COMPRESSING HARVESTED CROP MATERIAL TO PRODUCE SILAGE

CROSS-REFERENCE TO A RELATED APPLICATION

The invention described and claimed hereinbelow is also described in German Patent Application DE 10 2006 009 573.1 filed on Feb. 28, 2006. This German Patent Application, whose subject matter is incorporated here by reference, provides the basis for a claim of priority of invention under 35 U.S.C. 119(a)-(d).

BACKGROUND OF THE INVENTION

The present invention relates to a method and a device for compressing harvested crop material to produce silage in a horizontal silo.

Compression of layered crop material plays an important role in the stability of silage. If, during ensilage, the newly cut crop material is not compressed permanently and thoroughly, residual oxygen becomes enclosed in the individual layers of crop material, which can ultimately result in the growth of undesired organisms such as yeast and fungi, and to improper fermentation, which, in turn, can result in a considerable reduction in the nutritional content of the silage.

Publication DE 75 32 909 makes known a device and a method for compressing green crops laid down in single layers to produce silage in a horizontal silo. To compress the green crop evenly, a roller is supported in a drawbar-type frame, the carrying axle of which is designed as a shaft on which displaceable unbalanced bodies are located. Via a drive element assigned to the shaft, the carrying axle or shaft of the roller body is brought to a high rotational speed, by way of which the entire roller body is set into oscillating motion. When driving over the individual crop material layers, the roller oscillations are transferred to the green crop material, which results in a largely vertical compression of the green crop material.

The disadvantage of this design is that, even though the crop material layers have been compressed, the fact that the "rebound" potential of crop material varies means that pockets of oxygen can remain, which also results in the disadvantages described. Given that the individual layers of crop material can also have hills and valleys, it cannot be ensured—due to the predetermined roller width and the nearly vertical compression—that the hills and valleys will be closed during the rolling process. As such, when the next layer of crop material is laid down, pockets can remain. In addition, since the roller is capable of being driven around its longitudinal axis, it pushes the crop material to be compressed away from the actual compression area.

Publication DE 44 32 823 A1 discloses a device for use with horizontal silos that includes two rotating spreading elements. The device rests—with its underside, at least—on the material to be spread, and the material is spread in the horizontal silo by the rotatably driven spreader. The disadvantage of this design is the fact that the material is spread but not compressed.

SUMMARY OF THE INVENTION

The object of the present invention, therefore, is to prevent the disadvantages described in the related art and, in particular, to create a compressing procedure and a compressing device that ensure that the crop material laid down in individual layers in a horizontal silo for ensilage is compressed more evenly across the entire surface and more thoroughly than in the related art.

In keeping with these objects and with others which will become apparent hereinafter, one feature of the present invention resides, briefly stated, in a method for compressing crop material laid down in single layers for producing silage in a horizontal silo, comprising the steps of using an agricultural machine with a compressing device mounted on the agricultural working machine; compressing the crop material laid down in single layers by at least one compressing element; and weighing the at least one compressing element on the crop material and moving relative to the latter.

Another feature of the present invention resides, briefly stated, in a device for compressing crop material laid down in single layers for producing silage in a horizontal silo, using an agricultural working machine on which the compressing device is mounted, the device comprising at least one compressing element which compresses the crop material laid down in single layers and being configured so that said at least one compressing element weighs on the crop material and moves relative to it.

Given that the crop material laid down in individual layers is compressed by a compressing device which weighs on the crop material and moves relative to it, even and adequate compression across the entire surface of the crop material to be ensilaged is advantageously attained, since the silage material is not only compressed in the vertical direction, it is also pushed together via the relative motion.

In an advantageous embodiment of the present invention it is provided that the weighing down and the relative motion of the compressing device on the laid-down crop material take place simultaneously, so that the crop material is compressed in one working step and pockets in the silo can be closed at the same time, thereby preventing undesired oxygen pockets from forming in the silage.

The inventive method has proven particularly useful in practice when the weighing down is realized as a vertical force, and the relative motion takes place as a rotating or oscillating motion. A push-pull effect is therefore attained, which results in greater compression of the laid-down crop material than has been attained with the compression methods known in the related art.

Given that the weighing-down effect and the relative motion of the compressing device can be adjusted depending on the type of crop material to be ensilaged and/or the crop material properties, optimal and adequate compression of the crop material placed in the silo can be advantageously attained. This is particularly significant because the compression behavior depends mainly on the amount of moisture in the material to be compressed.

In a further advantageous embodiment of the present invention, the operator of the agricultural working machine on which the compressing device is mounted is informed about the type of crop material and/or its property before the crop material to be ensilaged is delivered, thereby allowing the operator to adjust the action of the compressing device based on this information and to compress the silage immediately.

According to an advantageous refinement of the present invention, the device for compressing crop material placed in the silo is designed such that it includes a frame with one or more compressing elements on its underside. Every compressing element has a large number of contact surfaces which can generate a vertical force and move relative to one another. With this embodiment, the compressing method can be used for ensilage in a horizontal silo using a simple design.

Given that the compressing elements are dome-shaped in design and include a large number of ribbed contact surfaces on their outer surface, their rotating effect on the crop material produces particularly high shear forces. The resultant effect of crop material being spread during the compressing procedure ensures that pockets in the silo can be closed.

Given that the compressing element(s) are designed as rotors and the individual rotor blades are designed arched upwardly, as viewed in the direction of rotation, the contact surface of the individual rotor blades is greater and a mandatory effect that occurs due to the active shear forces can be advantageously reduced.

In an advantageous refinement of the present invention, the compressing elements are integrated via drive shafts in a drive train and are rotatably driveable via drive shafts. The drive train is advantageously integrated in the existing frame of the compressing device. The rotational motion of the compressing elements can therefore be attained using a simple design, by way of which the desired shear forces are produced due to the action of the compressing elements on the crop material.

Given that the drive element of the compressing element(s) is drivably connected with the P.T.O. shaft of an agricultural working machine, the drive can be easily coupled to the existing P.T.O. shaft.

Given that the frame includes pivot points for attaching the three-point hydraulics of an agricultural working machine, and the vertical force of the compressing elements is variable via the operation of the three-point attachment, the compressing device can be brought into the working or transport position simply by lifting or lowering the three-point hydraulics, and pressure can be applied to the compressing elements in a variable manner.

Given that an additional weight element is assigned to the top of the frame, it is possible to ensure that the compressing elements apply a compression force on the crop material to be ensilaged in addition to pressure being applied via the three-point hydraulics. A particularly variable compression effect of the compressing elements is attainable when the weight element is composed of individual layer weights.

In an advantageous refinement of the present invention, any crop material build-ups that occur in front of the compressing device can be prevented particularly effectively when an additional crop material spreading device is assigned to the front of the compressing device.

In an advantageous embodiment of the present invention, the direction of rotation and/or the rotational speed of the compressing elements can be changeable, and they can vary between the compressing elements of the compressing device. This has the particular advantage that the compressing effect can be adjusted even more specifically to different crop material types and their properties.

In addition, the axes of rotation of the compressing elements can be tilted toward each other, and/or the compressing elements can be displaced relative to each other in the vertical direction. In this manner it becomes possible for the compressing device to better react to fluctuations in the layer height of crop material that is brought into the silo.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows the sequence of steps in the compression method using a schematic depiction in accordance with the present invention;

FIG. 2 shows the compressing device pulled by a tractor, in a schematic side view in accordance with the present invention;

DESCRIPTION OF THE PREFERRED EMBODIMENTS

Figure 4:
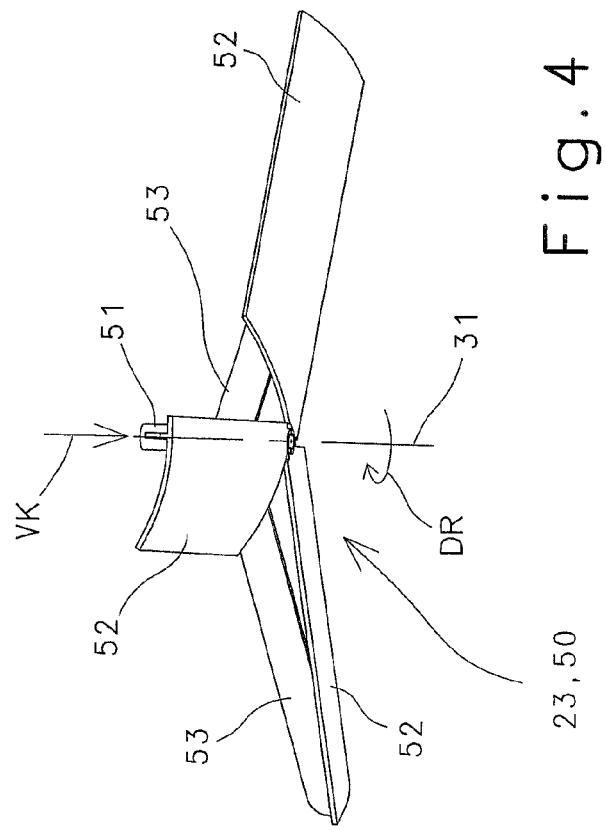
FIG. 4 shows a further embodiment of the compressing element, in a schematic side view in accordance with the present invention.

To explain the compression method, FIG. 1 shows—instead of a silo—any type of container 1 which accommodates crop material 2 placed in individual layers. A compressing element 5—which is designed according to the size of container opening 3 and as a pressing-rotating plunger 4 to which pressure is applied—rests with its underside on crop material 2 inside container 1. Domed driving elements 6 are located on the underside of pressing-rotating plunger 4. To perform rotational motions DB, pressing-rotating plunger 4 is non-rotatably connected with a drive shaft 7 and is rotatably drivable via a gearbox 8.

According to the present invention, pressing-rotating plunger 4 exerts a vertical force VK on loosely set-down crop material 2. While rotating horizontally, pressing-rotating plunger 4 exerts a shear force with domed driving elements 6, by way of which pockets in laid-down crop material 2 can be closed, and the "rebound" potential of crop material 2 can be reduced. The compression method known in the related art is therefore optimized and compression of crop material 2 is increased, thereby preventing undesired oxygen pockets in the silo.

FIG. 2 shows the side view of an agricultural working machine 10 designed as a tractor 12. Tractor 12 carries inventive compressing device 15 with its rear three-point attachment 13 via pivot points 14. Compressing device 15 serves to compress green crop material and similar silage material, e.g., in a horizontal silo, and is essentially composed of a frame 16 made of steel tubing. Two cross braces 17 are assigned to frame 16 for stability. Frame 16 is closed on the circumference by sheet metal panels 18 located at a right angle thereto. The entire bottom side of frame 16 is also closed by sheet metal panels 19, i.e., it forms a type of contact or sliding surface 20 there. Two offset compressing elements 23 are assigned to compressing device 15 on the bottom, for example. More or fewer compressing elements 23 can be provided. Each compressing element 23 is composed of a domed main body 24, on outer surface 25 of which ribbed driving elements 26 are provided.

Compressing elements 23 are drivable in a rotating or oscillating manner around their vertical rotational axes 31, which are perpendicular to contact or sliding surface 20. To this end, every main body 24 of every compressing element 23 is non-rotatably connected with a shaft 27, and can be driven via a drive train 28—which is not described in greater detail—by P.T.O. shaft 35 of tractor 12. It is also feasible that the position of rotational axes 31 of compressing elements 23 relative to contact or sliding surface 20 can be changed. On frame 16, a steel platform 36 which is fixedly connected with frame 16 extends across the width of compressing device 15 on the top side transversely to direction of travel FR. Platform 36 accommodates a weight element 37 that is composed of individual layer weights 38.

Via this weight element 37, compressing device 15 exerts a vertical force VK on laid-down crop material 2, in addition to its own weight and the possibilities offered by the three-point attachment. Due to the use of layer weights 38, vertical force VK exerted by compressing device 15 can be varied according to the different types of crop materials to be ensilaged. Compressing device 15 can be brought into the working or transport position via three-point hydraulics 40 of tractor 12. At the same time, pressure can be applied to compressing device 15. It is also feasible to vary the tilting of compressing device 15 relative to laid-down crop material 2 using three-point hydraulics 40 of tractor 12, in order to prevent build-ups of crop material 2 in front of compressing device 15 and, therefore, to prevent compressing device 15 from being driven into laid-down crop material 2.

A crop material spreading device 41 which is known per se is assigned to compressing device 15 on the side of compressing device 15 opposite to tractor 12. Crop material spreading device 41 includes two brackets 42 which are rotatably connected with frame 16 of compressing device 15. On their lower ends, brackets 42 accommodate a spreading element 45 which is drivable around a horizontal axis 44. Spreading element 45 is composed of a roller body 46, on surface 47 of which material spreaders 48 that point in the radial direction are located. Rotatably drivable spreading element 45 distributes crop material 2 that builds up in front of compressing device 15 onto the silo. To adjust the height of crop material spreading device 41, lifting cylinders 49 which are hingedly connected with frame 16 of compressing device 15 are assigned to brackets 42.

An effective use of compressing device 15 can be attained when a compressing device 15 is assigned to the front, back and sides of tractor 12, by way of which particularly large silo surfaces can be compressed more rapidly. To attain optimal compression of crop material 2, it is also advantageous that the action of the vertical force VK of compressing device 15 and rotational motion DB of individual compressing elements 23 are adjustable depending on the type and/or properties of crop material to be ensilaged. It is feasible that the type and/or property of crop material are communicated to operator 11 of tractor 12 before crop material 2 to be ensilaged is delivered, so that compressing device 15 can be adjusted in an optimal manner.

The optimization of the adjustment of compressing device 15 can be the change in the direction of rotation and rotational speed of compressing elements 23, the change from rotating to oscillating motion of the compressing elements and weight adjustment and control of three-point hydraulics 40. To compress crop material 2, compressing device 15 rests with contact or sliding surface 20 on laid-down crop material 2 and, via weight element 37 and/or three-point hydraulics 40, exerts a vertical force VK on crop material 2, while individual compressing elements 23—which are rotating around their vertical rotational axis 31 with assigned, ribbed driving elements 26—cause crop material 2 to be pushed together via the shear forces produced, thereby closing any undesired pockets in the silo.

Figure 3:
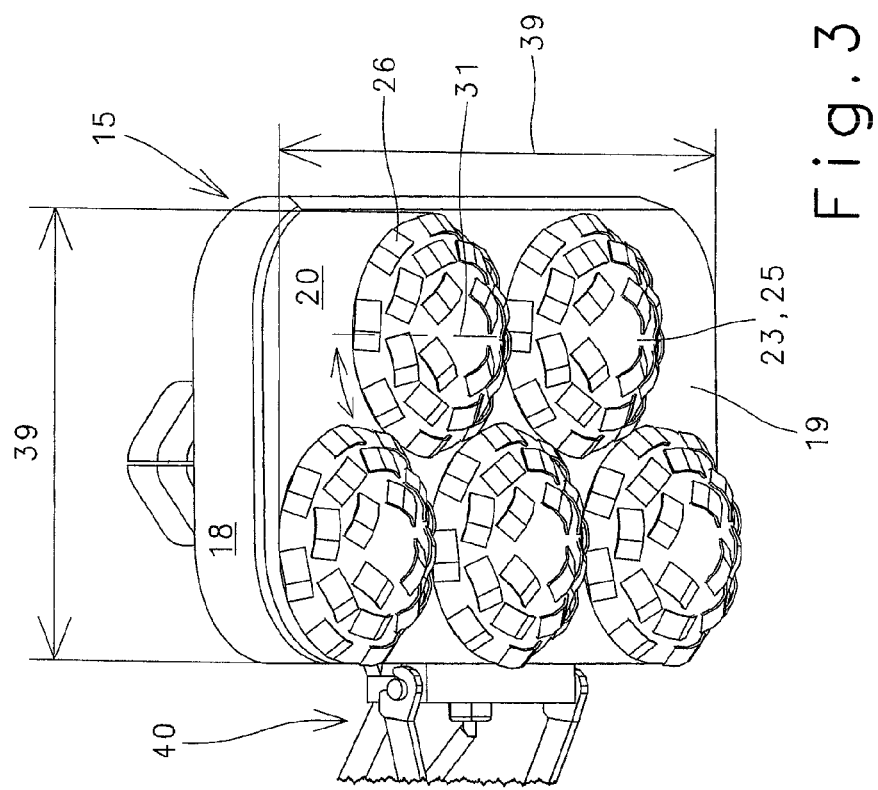
FIG. 3 shows an embodiment of the compressing element, in a schematic side view in accordance with the present invention.

FIG. 3 shows inventive compressing device 15—which was described in greater detail in FIG. 2—in a schematized side view, diagonally from below. A large number of domed compressing elements 23 are assigned to the bottom of compressing device 15, on contact or sliding surface 20. A larger number of ribbed driving elements 26 is located on surface 25 of compressing elements 23. Compressing elements 23 are offset relative to each other and determine working width 39 of the compressing device. Working width 39 can extend beyond sheet metal panels 18, 19 located on the circumference. Compressing elements 23 are drivable in a rotating manner around their vertical rotational axis 31, perpendicular to contact or sliding surface 20, via a drive train 28 which is known per se and is therefore not shown. Given that compressing elements 23 are offset relative to each other, laid-down crop material 2 is compressed across entire working width 39, and pockets in the silage are closed via the shear forces produced by compressing elements 23.

FIG. 4 shows a single compressing element 23 to which pressure is applied in the form of a rotor element 50, in a side view from below. It can be used instead of domed compressing element 23 in FIG. 2 on compressing device 15. Rotor element 50 is composed of a rotor shaft 51, to which three rotor blades 52 are assigned, for example. Rotor element 50 itself is rotatably drivable around its vertical axis via a not-shown shaft and a not-shown drive train. To enhance stability, cross braces 53 are assigned to the top of rotor blades 52. Cross braces 53 extend from rotor shaft 51 to the ends of rotor blades 52. During the compression procedure, shear forces produced by the rotational motion of rotor blades 52 act on the crop material and close pockets in the silo, by way of which an optimal, overall compression of the silage can be attained.

To increase the compressing effect of the compressing elements even further, or to allow them to be adapted very flexibly to different crop material, it can be provided in an advantageous embodiment of the present invention that compressing elements 23 of compressing device 15 are operated individually or in groups with different rotational speeds. In addition, to better adapt to the crop material—which is typically distributed very unevenly in the vertical direction—it can be provided that axes 31 of compressing elements 23 are tilted toward each other, or compressing elements 23 are offset vertically on compressing device 15.

It will be understood that each of the elements described above, or two or more together, may also find a useful application in other types of constructions differing from the type described above.

While the invention has been illustrated and described as embodied in a method and device for compressing harvested crop material to produce silage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A compressing device for compressing crop material laid down in single layers for producing silage in a horizontal silo, in combination with an agricultural working machine on which the compressing device is mounted, the device comprising:

at least one compressing element which compresses, weighs on, and moves relative to the crop material; and a plurality of individual layer weights variably disposed on a top side of the compressing device to vary a weighing effect of the compressing device on the crop material.

2. A device as defined in claim 1, wherein said compressing device includes a frame having a lower end carrying the at least one compressing element that rotates around a vertical axis, and a plurality of driving elements assigned to the at least one compressing element.

3. A device as defined in claim 2, wherein said compressing element is domed-shaped and includes a large number of the driving elements that are ribbed on its outer surface.

4. A device as defined in claim 2, wherein said compressing element is configured as a rotor with individual rotor blades configured to be arched upwardly as viewed in a direction of rotation.

5. A device as defined in claim 2, wherein a plurality of said compressing elements is provided and integrated via drive shafts in a drive train, and wherein said compressing elements are rotatably drivable via said drive shafts.

6. A device as defined in claim 5, wherein said drive train is integrated in said frame.

7. A device as defined in claim 5, wherein said drive train is integrated in a driving manner with a power takeoff shaft of the agricultural working machine.

8. A device as defined in claim 2, wherein said frame includes pivot points for installation of a three-point hydraulics of the agricultural working machine, and so that a vertical force of the compressing element is variable via operation of said three-point attachment.

9. A device as defined in claim 2, wherein the at least one compressing element comprises a plurality of compressing elements configured so that they generate a vertical force and are movable relative to each other.

10. A device as defined in claim 9, wherein the frame extends transversely to a travel direction of the compressing device.

11. A device as defined in claim 1; and further comprising a driven crop material spreading device assigned to the compressing device.

12. A device as defined in claim 2, wherein the at least one compressing element comprises a plurality of compressing elements arranged so that a parameter being at least one of a direction of rotation and a rotational speed of the compressing elements is changeable, and a variable among said compressing elements.

13. A device as defined in claim 12, wherein said compressing elements have axes of rotation that are tiltable relative to each other.

14. A device as defined in claim 12, wherein said compressing elements are shifted in a vertical direction relative to each other.

* * * * *